United States Patent [19]
Yamanaka et al.

[11] 3,860,923
[45] Jan. 14, 1975

[54] VEHICLE COLLISION ANTICIPATING DEVICE

[75] Inventors: Teruo Yamanaka, Seto; Takayuki Kato, Aichi-ken; Osamu Ozeki, Nagoya; Kazuo Sato; Minoru Bito, both of Toyota, all of Japan

[73] Assignees: Toyoto Jidosha Kogyo Kabushiki Kaisha; Kabushiki Kaisha Toyota Chuo Kenkyusho, both of Aichi-ken, Japan

[22] Filed: Apr. 4, 1973

[21] Appl. No.: 347,804

[30] Foreign Application Priority Data
Apr. 8, 1972 Japan............................. 47-35338

[52] U.S. Cl. ................................ 343/7 ED, 343/9
[51] Int. Cl. .............................................. G01s 9/02
[58] Field of Search ........................... 343/7 ED, 9

[56] References Cited
UNITED STATES PATENTS
3,735,398  5/1973  Ross ............................ 343/7 ED
3,745,572  7/1973  Sato et al. .................... 343/7 ED
3,757,325  9/1973  Sato et al. .................... 343/7 ED
3,772,694  11/1973 Sato et al. .................... 343/7 ED Primary Examiner—T. H. Tubbesing

[57] ABSTRACT

An improvement of a vehicle collision anticipating device using transmitted and reflected frequency modulated continuous waves is provided. A low frequency wave is produced by mixing a part of a transmitted wave and a reflected wave from an object. The low frequency wave and at least one Doppler signal obtained from the low frequency wave are signal processed so as to generate signals. A distance between the vehicle and object is detected. An intensity of said Doppler signal is detected. A collision of the object against the vehicle is anticipated by detecting the object entering a predetermined distance range in front of the vehicle and a predetermined minimum intensity range determined by the positions and angles of the transmitting and receiving antennas.

13 Claims, 16 Drawing Figures

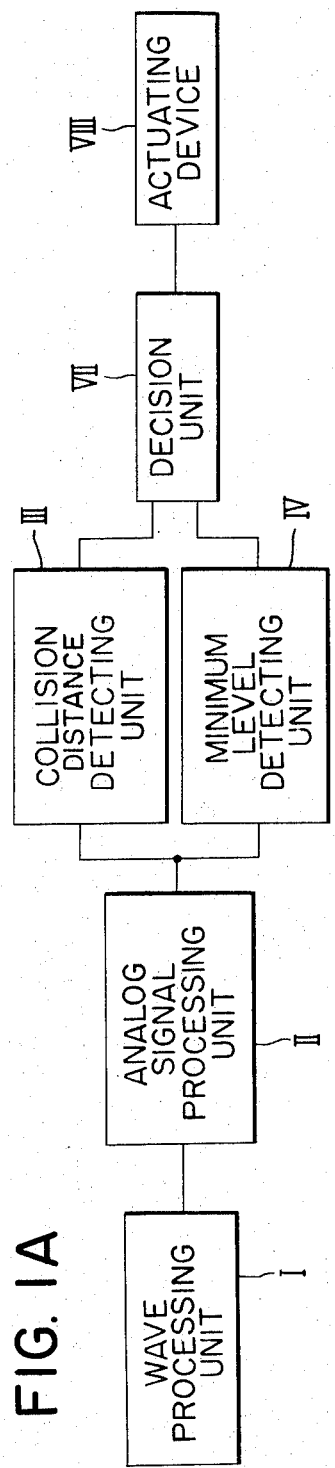
FIG. IA
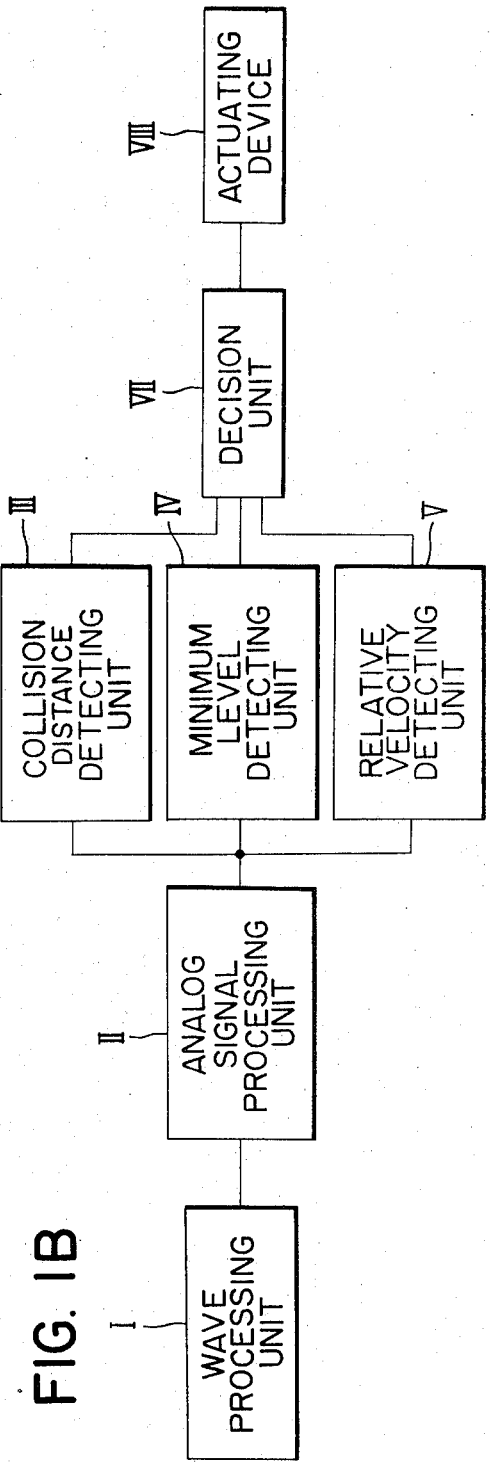
FIG. IB

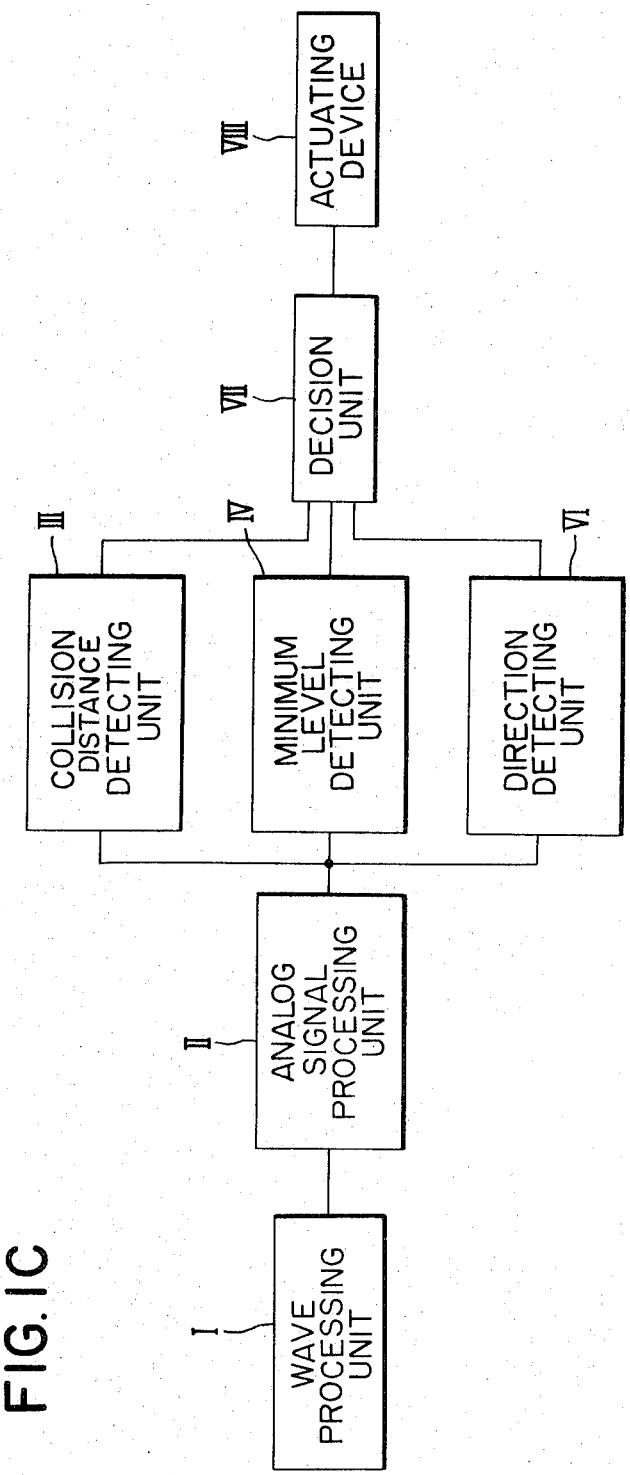

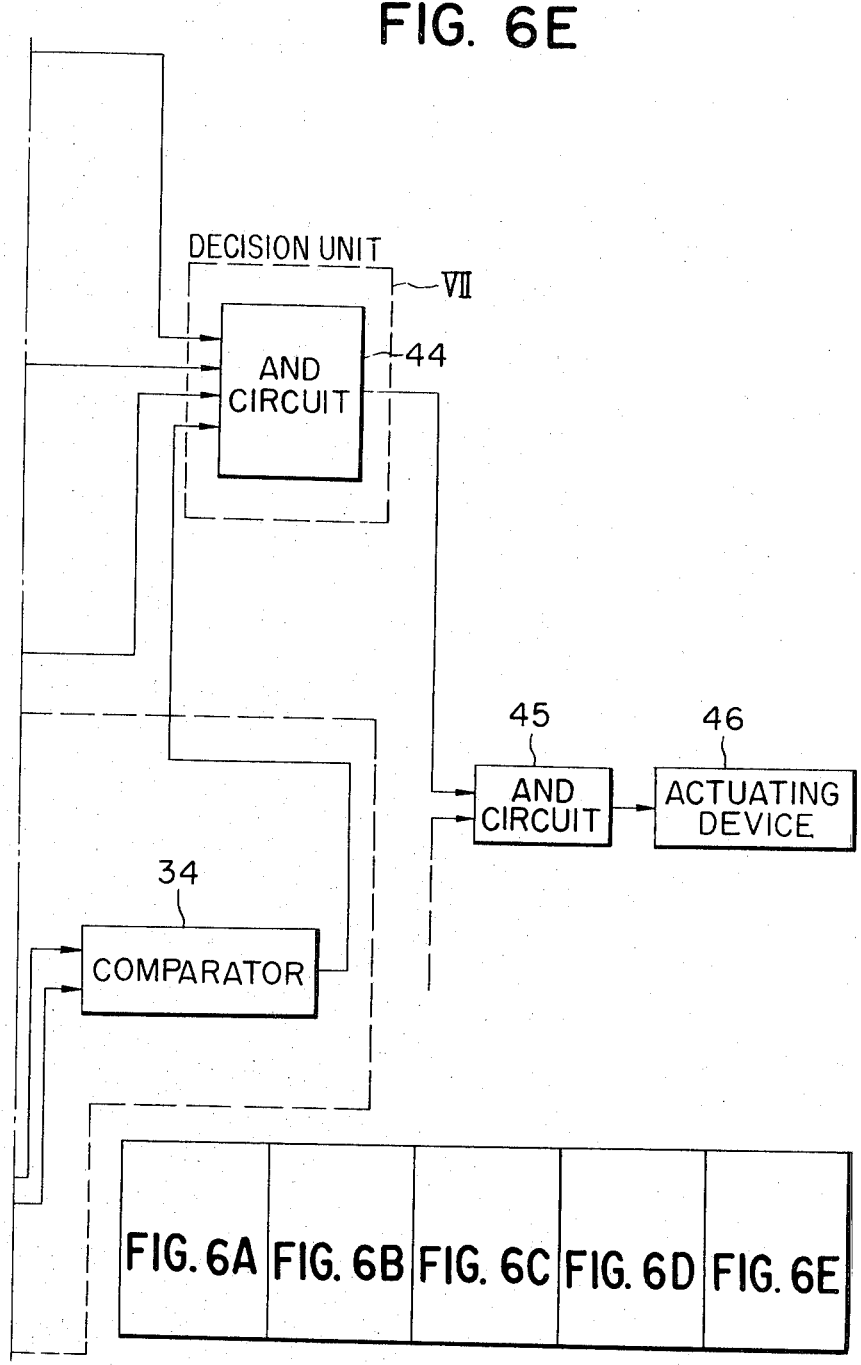

3,860,923

VEHICLE COLLISION ANTICIPATING DEVICE

BACKGROUND OF THE INVENTION

The present invention relates to a device for anticipating the collision of an automotive vehicle against an object by utilizing the wave radiated from the vehicle and reflected by the object, thereby actuating at the optimum time a passive restraint device, for example, a device for inflating a gas bag before the collision takes place thereby surrounding a driver so that he may be prevented from striking a front dashboard of the vehicle and being seriously injured.

In order to anticipate or detect the collision of a vehicle against an object or another vehicle, the distance between the object and the vehicle must be measured. However, the ordinary distance measuring apparatus such as radar systems using electromagnetic waves cannot measure the distance between the object and the vehicle with a required degree of accuracy, especially when the object is very close to the vehicle, for example, 1 to 2 meters from the vehicle. Therefore the ordinary distance measuring apparatus cannot be used in the collision anticipating device whose reliability in operation must be very high. In order to detect an object with an extremely high degree of accuracy, the frequency deviation of the an ordinary FM-CW radar system must be higher than 100 MHz, resulting in various technical problems. When the frequency deviation is reduced, the system becomes very complex in construction because the fixed error must be minimized. In case of pulse radar systems, the rise time of the pulse must be less than a few nanoseconds. This also presents various technical difficulties. The collision anticipating device must also detect whether an object is moving toward or away from a vehicle. Generally, prior art devices for detecting the direction of an object from the phase difference between two signals at two different points spaced apart from each other by 90° are complex in construction and expensive to manufacture.

SUMMARY OF THE INVENTION

The present invention was made to overcome the above and other related problems and undesirable effects encountered in the prior art collision anticipating devices for vehicles. According to the present invention, the collision anticipating device provides a collision signal only when the collision of the vehicle against the object is unavoidable, by detecting an object within the detection range defined by beams of the transmitting and receiving antennas and by detecting a distance between the vehicle and the object. In response to the collision signal, a safeguarding device is actuated to prevent the secondary collision in which a driver is suddenly pushed forward by his own momentum and hits against the front dashboard of the vehicle. When the angle between the direction of travel of the vehicle and that of the moving object is large, i.e., when the moving object is just crossing the path of the vehicle or when the vehicle is passing the object so that there is no reasonable expectation that a collision will take place, the safeguarding device will not be actuated. (In this specification, the operation of the safeguarding device when it is not needed will be referred to as an "inadvertent operation"). Thus the present invention provides a very reliable collision anticipating device which predicts a collision from the distance between a vehicle and an object, thereby actuating the safeguarding device at the optimum time under various conditions.

One of the objects of the present invention is therefore to provide a collision anticipating device, for use with a device for protecting a driver in case of collision, which is simple in construction and highly reliable in operation and which provides the collision signal by detecting that an object comes into the detection range defined by the transmitting and receiving beams and by detecting a distance between a vehicle and an object, so that the protecting or safeguarding device can be actuated at the optimum time, and the inadvertent operation of the safeguarding device can be prevented. In addition, the device should be insensitive to the reflection factor and dimensions of an object. Also the inadvertent operation due to the fact that the same intensity ratio or the same phase difference represents two different distances to an object, or the inadvertent operation when there is no reasonable expectation that the collision will take place because the vehicle is just passing the object can be positively prevented.

Another object of the present invention is to provide a collision anticipating device which detects the relative velocity of an object with respect to a vehicle, so that the inadvertent operation of a safeguarding device may be prevented when the vehicle is traveling at a speed insufficient to cause injury to a driver, or when the vehicle is at rest or parked.

Still another object of the present invention is to provide a collision anticipating device which detects the direction of an object so that the inadvertent operation of the safeguarding device may be prevented when the vehicle is just passing the object or the object is crossing the path of the vehicle.

The above and other objects, features and advantages of the present invention will become more apparent from the following description of some preferred embodiments taken in conjunction with the accompanying drawings.

BRIEF DESCRIPTION OF THE DRAWINGS:

FIG. 6A to FIG. 6E show a block diagram of the fourth embodiment shown in FIG. 1D;

BRIEF DESCRIPTION OF THE INVENTION

Figure 1D:
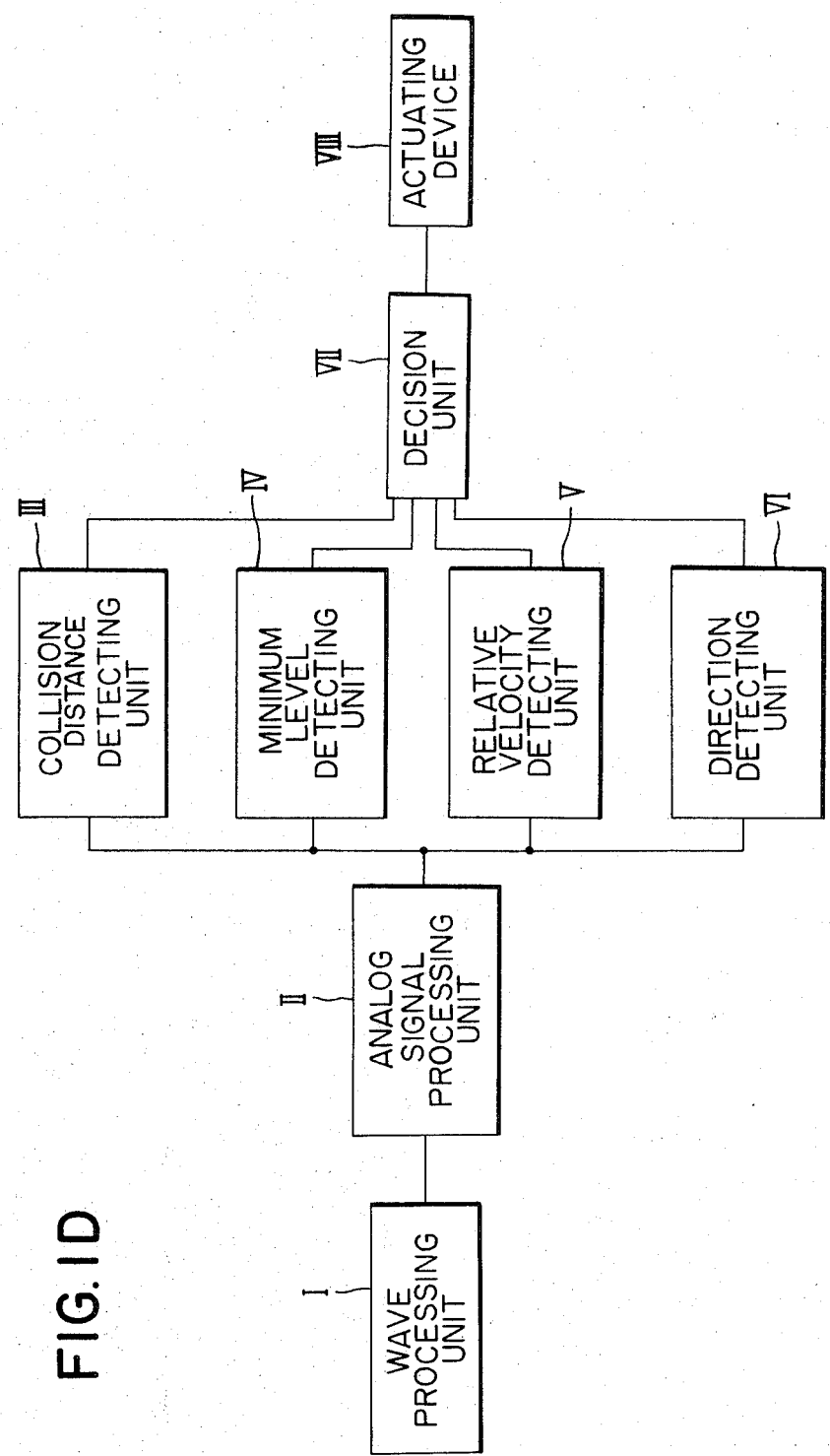
FIGS. 1A, B, C and D are each block diagrams of four separate embodiments of the present invention.
Figure 1E:
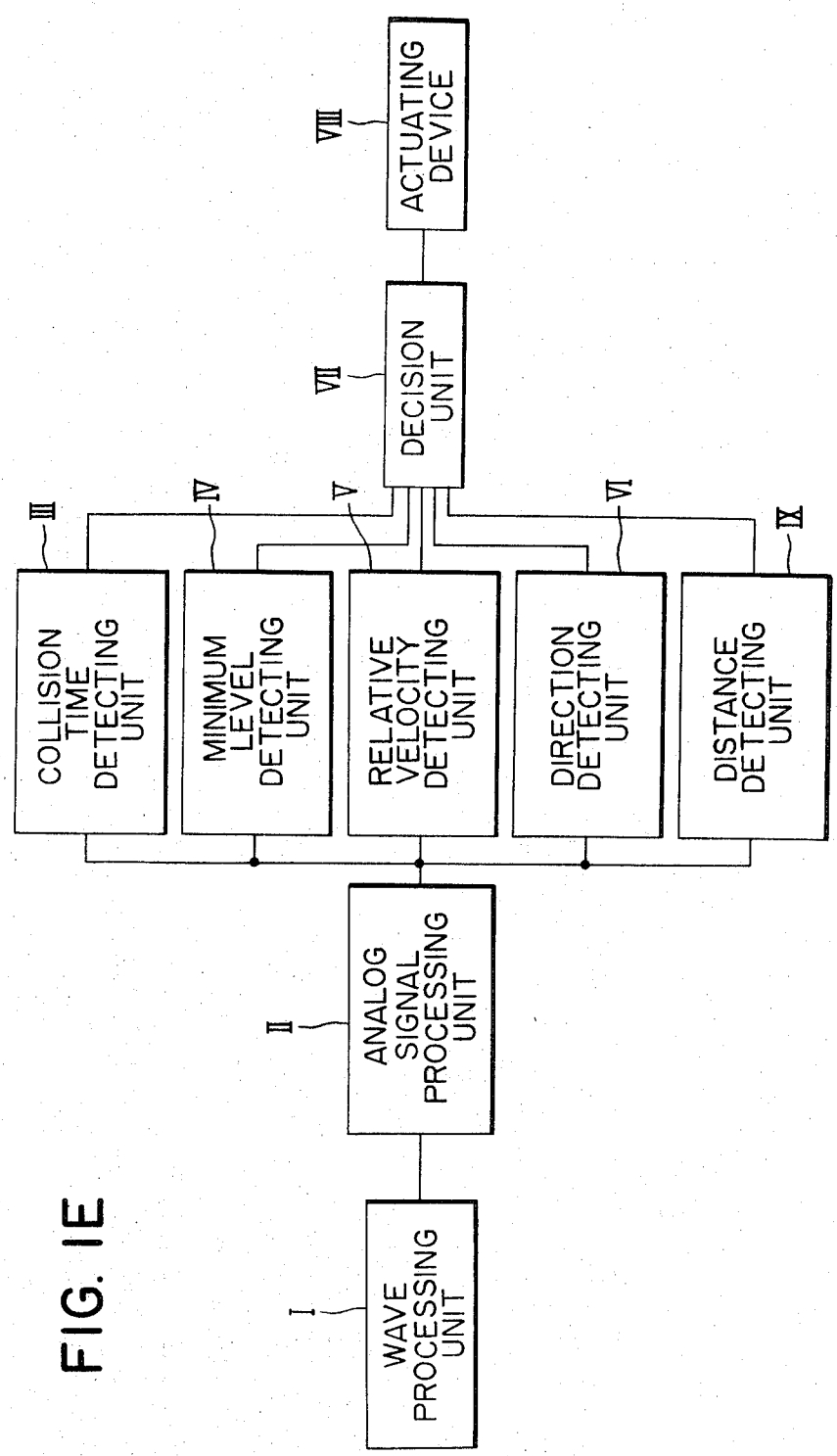

In order to facilitate understanding of some preferred embodiments of the present invention, the general description thereof will be made.

A collision anticipating device in accordance with the present invention generally comprises a transmitting antenna for transmitting a wave; a receiving antenna for receiving the wave transmitted by said transmitting antenna and reflected by an object, said receiving antenna being so located that the beam axis of said receiving antenna may intersect that of said transmitting antenna in a predetermined range; a first circuit for generating signals based upon a wave obtained from the transmitted and received waves; a second circuit for deriving a signal when the intensity of the Doppler signal obtained from the wave, which is derived by mixing the transmitted wave, with the received wave reaches a predetermined minimum level, so as to detect an object which comes into a predetermined range defined by the positions and angles of said transmitting and receiving antennas, a third circuit for deriving a signal when the distance between a vehicle and an object is less than a predetermined value; and a fourth circuit for deriving a signal only when said second and third circuits simultaneously provide output signals. (The device may comprise one or more of each of the above elements, and the same hereinafter.)

The second circuit detects whether or not an object comes into a predetermined intensity range defined by the positions and angles of the transmitting and receiving antennas, i.e., the transmitted and received beams; the third circuit detects whether the distance between the vehicle and object is less than a predetermined value; and in response to the output signals of the second and third circuits, the fourth circuit provides an output signal, thereby actuating a device VIII for operating a safeguarding device at the optimum time. Thus, the device with these circuits can prevent the inadvertent operation of the safeguarding device when the vehicle is merely passing the object and enables the safeguarding device to actuate at the optimum time in a highly reliable manner.

A collision anticipating device in accordance with the present invention may further comprise, a fifth circuit for detecting the relative velocity of an object with respect to a vehicle, and provides an output signal when said detected relative velocity reaches a predetermined velocity.

The device further comprising the fifth circuit for detecting the relative velocity of an object with respect to a vehicle can more securely prevent the inadvertent operation of the safeguarding device. In other words, the safeguarding device is actuated only when the relative velocity is higher than a predetermined velocity, so that the safeguarding device must be actuated, while it will not be acuated, for example, when the vehicle is traveling at such a low speed that the driver would not be seriously injured even when the vehicle collides against the object, or when the vehicle is being slowly parked between the vehicles in a parking area.

A collision anticipating device in accordance with the present invention may further comprise, a sixth circuit for detecting a direction of a relative movement of an object with respect to a vehicle. The device, further comprising the sixth circuit for detecting whether an object is moving toward or away from the vehicle, can more securely prevent the inadvertent operation of the safeguarding device. In other words, the safeguarding device is not actuated when the object is moving away from the vehicle, that is, when the distance between the vehicle and the object is increasing, or when the object is merely crossing the path of the vehicle.

The device may further comprise both the fifth and sixth circuits, and can serve to prevent the inadvertent operation of the safeguarding device more effectively when the vehicle is traveling at such a slow speed that the driver will not be seriously injured due to the secondary collision or when the vehicle is at rest or parked, as well as when the object is moving away from the vehicle i.e., when the object is merely passing across the path of the vehicle or when the vehicle is passing the object so that the collision will not take place. Thus, the device further comprising the fifth and sixth circuits is more reliable in operation.

First Embodiment, FIGS. 1A, 2, 3, 4, 5

The first embodiment of a collision anticipating device in accordance with the present invention generally comprises a pair of wave processing units I, a pair of analog signal processing units II, a pair of collision distance detecting units III, a pair of minimum level detecting units IV and a decision unit VII.

The right and left units in each pair of units are the same in construction and function, so the description will be made only with respect to one of the right and left units for simplicity in this embodiment as shown in FIG. 1A and the following embodiments as shown in FIGS. 1B – 1D.

The wave processing unit I includes a transmitting antenna for transmitting a wave and a receiving antenna for receiving the wave. The analog signal processing unit II corresponds to the first circuit for generating signals based upon a wave obtained from the transmitted and received waves. The collision distance detecting unit III corresponds to the third circuit for deriving a signal by detecting the distance between a vehicle and an object. The minimum level detecting unit IV corresponds to the second circuit for deriving a signal when the intensity of the Doppler signal obtained from the wave which is derived by mixing the transmitted and received waves, reaches a predetermined minimum level, so as to detect an object which comes into a predetermined range defined by the positions and angles of the transmitting and receiving antennas. The decision unit VII corresponds to the fourth circuit for deriving a signal only when the collision distance detecting unit III and the minimum level detecting unit IV simultaneously output the signals.

More particularly, the output of the wave processing unit I is applied to the input of the analog signal processing unit II, the output of which is applied to both of the collision distance detecting unit III and the minimum level detecting unit IV. The outputs of the units III and IV are applied to the input of the decision unit VII.

The transmitting antenna 9 radiates microwaves having a carrier frequency of 10.525 GHz in a predetermined beam pattern, and the receiving antenna 10 receives the wave reflected by an object. The transmitting and receiving antennas 9 (9R, 9L) and 10 (10R, 10L) are mounted on a vehicle M as shown in FIGS. 2 and 5.

Figure 2:
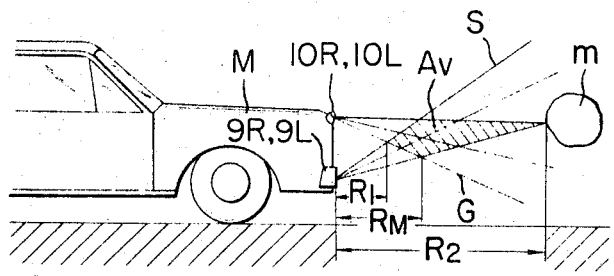
FIG. 2 is a schematic side view illustrating the transmitting and receiving antennas of the collision anticipating device mounted on a vehicle and the beams of the transmitting and receiving antennas which form the detection range.

FIG. 2 shows a schematic side view of a vehicle M on which the right and left transmitting antennas (9R, 9L) and receiving antennas (10R, 10L) are mounted, together with the beams of the right transmitting antenna 9R and the right receiving antenna 10R. The vertical beam pattern of the transmitting antenna 9R due to its vertical directivity is designated as S, whereas the vertical beam pattern of the receiving antenna 10R due to its vertical directivity is designated as G. As is well known in the art of the bistatic radar system, the intensity of the reflected wave is substantially increased when the object is in the detection range $A_V$ (the hatched area in FIG. 2 and to be referred to as "the detection range" hereinafter) where the beams G and S intersect each other.

Figure 5:
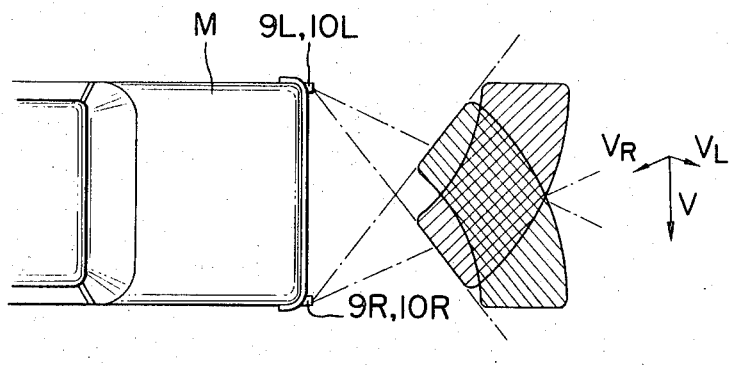
FIG. 5 is a schematic top view illustrating the detection range defined by the beams of the transmitting and receiving antennas.

FIG. 5 shows a schematic top view of the vehicle M on which the transmitting antennas (9R, 9L — not shown) and receiving antennas (10R, 10L) are so mounted that the beams thereof may overlap each other to form the detection range.

Figure 3:
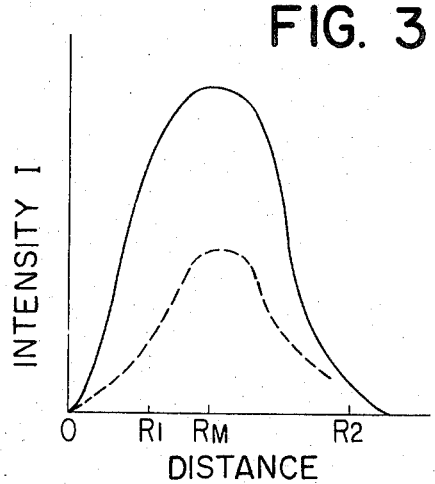
FIG. 3 is a graph illustrating the relation between the distance to an object within or near the detection range which is defined by the beams of the transmitting and receiving antennas and the intensity of the wave reflected by the object.

The intensity I of the reflected wave is shown in FIG. 3. The distance R from the top O of the transmitting or receiving antenna 9R (9L) or 10R (10L) is plotted along the abscissa, whereas the intensity of the wave reflected by the object m at a distance R from the point O and received by the receiving antenna 10R (10L) is plotted along the ordinate. It is seen that when the object m is farther than a distance $R_2$, the farthest point in the detection range from the vehicle, the intensity I of the received wave is almost equal to zero. As the object m moves into the detection range and toward the vehicle M, the intensity I is suddenly increased, and when it approaches the distance $R_M$ where the beam axes of the transmitting and receiving antennas intersect, the intensity I becomes maximum. Then the intensity is reduced, and when the object m comes within the distance $R_1$ in the detection range, the nearest point to the vehicle, the intensity is suddenly reduced. In FIG. 3, the broken curve shows the intensity when the reflection factor of the object m is relatively small. It is apparent that while the amplitudes of the two curves may differ, the shapes of the characteristic curves are similar independently of the reflection factors of the objects. At the distance $R_2$ in the detection range both the shape and amplitude are similar. Therefore, it is possible to detect the object m at the distance $R_2$ with a tolerable degree of accuracy from the intensity I. The operation of the minimum level detecting unit IV is based upon this principle, and it is so arranged that it provides an output signal when the intensity of the received wave reaches a predetermined minimum level, that is, when the distance to the object m is less than $R_2$.

The analog signal processing unit II processes the output of the wave processing unit I based upon the principle to be described in more detail hereinafter and outputs a signal to the collision distance detecting unit III and the minimum level detecting unit IV.

Next the principle of detecting the distance to the object m used in the analog signal processing unit II in the embodiments of the present invention will be described.

The transmitted waves which are modulated in frequency by a sinusoidal wave are transmitted toward the object m, and a part of the transmitted waves and the waves reflected by the object and received by the receiving antenna 10 are mixed in order to derive the low frequency wave given by $$e = r \cos\left\{ \omega_c \Delta t + 2m_f \sin\frac{\omega_m \Delta t}{2} \cos\left(\omega_m t + \frac{\omega_m \Delta t}{2}\right) \right\}$$

$$= r \cos \omega_c \Delta t \Bigg\{ J_0(m_r)$$

$$+ 2\sum_{n=1}^{\infty}(-1)^n \cos 2n\left(\omega_m t + \frac{\omega_m \Delta t}{2}\right)$$

$$\cdot J_{2n}(m_r) \Bigg\} - r \sin \omega_c \Delta t \Bigg[ 2\sum_{n=0}^{\infty}(-1)^n \cos\Bigg\{(2n+1)$$

$$\cdot \left(\omega_m t + \frac{\omega_m \Delta t}{2}\right) \Bigg\} J_{2n+1}(m_r) \Bigg] \quad (1)$$

where
$r =$ coefficient given depending upon the reflection factor of an object, the characteristics of the mixer and the like;
$\omega_c =$ angular frequency of a carrier wave;
$\Delta t =$ time interval between the time a wave is transmitted and the time the wave reflected is received;
$mf =$ frequency modulation index;
$\omega_m =$ angular frequency of modulated wave; and
$J_{2n} =$ Bessel function of $2n$ order of the first kind;

$$m_f = 2\pi \Delta f / \omega_m$$

and $$m_r = 2mf \sin \omega_m \Delta t / 2$$

(2)

where $$\Delta t = 2R/C$$

(3)

where
$R$ : distance to an object
$C$ : velocity of radiation wave, and
$\Delta f$ : frequency deviation.

The a-c signal voltage $e$ given by Eq. (1) is the sum of the frequency components such as a Doppler signal component, a fundamental wave component and harmonic components given by $$rJ_0(m_r) \cos \omega_c \Delta t,$$

$$-2rJ_1(m_r) \cos(\omega_m t + \omega_m \Delta t/2) \sin \omega_c \Delta t,$$

$$-2rJ_2(m_r) \cos(2\omega_m t + \omega_m \Delta t) \cos \omega_c \Delta t,$$

When an object is moving at a constant relative velocity $v$ with respect to a vehicle, the first and second terms, $rJ_0(m_r) \cos \omega_c \Delta t$ and $$-2rJ_1(m_r) \cos(\omega_m t + \omega_m \Delta t/2) \sin \omega_c \Delta t$$

become $$rJ_0(m_r) \cos \omega_d t$$

and $$-2rJ_1(m_r) \cos(\omega_m t + \omega_m \Delta t/2) \sin \omega_d t,$$

respectively, where $\omega_d =$ Doppler angular frequency, $2v/C \ \omega_c$ (4)

Figure 4:
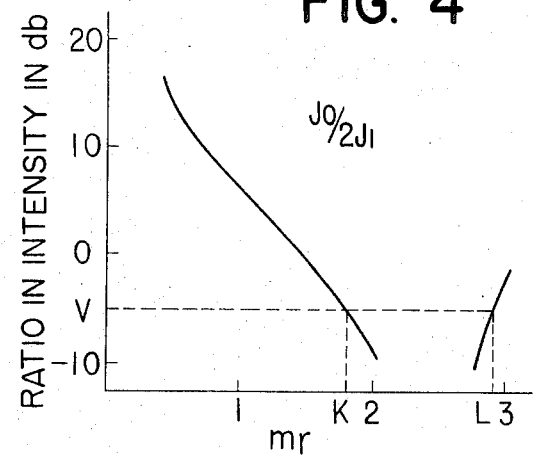
FIG. 4 is a graph illustrating the relation between the distance to an object and the ratio in intensity between frequency components of the output signal of a mixer in the collision anticipating device.

The first term represents the Doppler signal component, and the second term also represents the Doppler signal component, $-2rJ_1(m_r) \sin \omega_d t$, when demodulated. The ratio in intensity between the maximum values of the first and second terms is given by $J_0(m_r)/2J_1(m_r)$ which is a function of $m_r$, that is, a distance to the object as shown in FIG. 4.

However, $m_r$ may have two values at the same ratio in intensity. For example, when the intensity ratio is $V$, $m_r$ has two values $K$ and $L$ as shown in FIG. 4. As a result, the inadvertent operation tends to occur. That is, the object at a distance $K$ in terms of $m_r$ may be taken as being at a distance $L$ in terms of $m_r$, and vice versa. However, according to the present invention, the transmitting and receiving antennas are so mounted on the vehicle M that the object $m$ within the distance $R_2$ may be detected with accuracy from the intensity of the reflected wave. Therefore, the frequency deviation $\Delta f$ is so determined that the distance to an object may be determined uniquely from the intensity ratio. Thus, the distance to an object may be correctly detected from the ratio in intensity between the first and second terms.

In response to the output signal from the analog signal processing unit II, the collision distance detecting unit III detects whether or not the distance between the vehicle and the object is less than a predetermined value. It should be noted in the instant embodiment the distance is now always calculated, but only whether the distance is less than a predetermined value or not is detected.

Next the general mode of operation of the first embodiment will be described. The wave is transmitted from the transmitting antenna 9 in the wave processing unit I when the vehicle M is moving, and the wave reflected by the object is received by the receiving antenna 10 and processed by the analog signal processing unit II based upon the principle described above so that the output thereof is fed to the collision distance detecting unit III and to the minimum level detecting unit IV. When the object $m$ comes into the detecting range described hereinbefore, the minimum level detecting unit IV provides an output signal. The collision distance detecting unit III provides an output signal when the distance between the vehicle and the object is less than a predetermined value in response to the signal from the analog signal processing unit II. When the output signals of the units III and IV are simultaneously applied to the decision unit VII, the latter provides an output signal so that a device VIII for actuating a safeguarding device may be actuated, thereby protecting the driver as well as the passengers in case of collision.

In the first embodiment of the present invention, th right and left transmitting and receiving antennas 9 and 10 are so mounted on the vehicle M that the beams of the transmitting and receiving antennas 9 and 10 may define the detection range as shown in FIGS. 2 and 5. Therefore, the intensity of the wave reflected by an object off the course of the vehicle and received by only one of the receiving antennas 10 is extremely low, so that the minimum level detecting unit IV will not provide an output signal when an object is merely passing off the course of the vehicle. Thus the inadvertent operation of the safeguarding device may be effectively prevented. The minimum level detecting unit IV detects whether or not the intensity of the wave reflected by an object is in excess of a predetermined level at the distance $R_2$ in the detection range, the farthest point from the vehicle, regardless of the dimensions and reflection factor of an object, so that the safeguarding device will not be adversely influenced by the dimensions and reflection factor of the object. In other words, as soon as an object comes into the detection range, the minimum level detecting unit IV provides an output signal independently of the dimensions and reflection factor of an object. In the radar system employed in the instant embodiment, the same intensity ratio gives two different distances to an object as described in detail with reference to FIG. 4 so that the object having a large reflection factor and positioned at a long distance away from the vehicle may be mistaken as being located at a relatively short distance from the vehicle. However, in the present invention, because of the above-mentioned arrangements of the transmitting and receiving antennas and because of the function of the minimum level detecting unit IV, the inadvertent operation of the safeguarding device will be prevented. The same is true even when the present invention is applied to the other radar system such as the AM or two-frequency radar system or the like.

Further, in the instant embodiment, the distance between the vehicle and the object is not calculated. Instead, a signal is provided only when the distance is less than a predetermined value so that the object may be detected before the distance becomes less than one meter and the safeguarding device may be actuated at the optimum time. When the distance is in excess of one meter, the safeguarding device will never be actuated. Thus the function of the first embodiment is substantially similar to the prior art system in which the distance to an object is measured, but the first embodiment uses a simpler electronic circuit, is more reliable and dependable in operation and is less expensive in manufacture.

Second Embodiment, FIG. IB

The second embodiment of the present invention is similar to the first embodiment except that a relative velocity detecting unit V is inserted between the analog signal processing unit II and decision unit VII in parallel with the collision distance detecting unit III and the minimum level detecting unit IV.

In the relative velocity detecting unit V, the Doppler angular frequency $\omega_d$, which is proportional to the relative velocity $v$ as described with refernece to Eq. (4), is directly converted into a voltage in an analog manner and is compared in comparator with a reference voltage, so that the relative velocity detecting unit will provide an output signal only when the relative velocity is in excess of 30 Km/h. In the second embodiment, therefore, only when the collision distance detecting unit III, the minimum level detecting unit IV and the relative velocity detecting unit V simultaneously provide output signals to the decision unit VII, the latter provides an outputs signal to actuate the actuating device VIII.

In addition to the features of the first embodiment, the second embodiment has an important feature in that it will not provide the collision signal when the relative velocity is less than a predetermined low speed such as 30 Km/h or when the vehicle is at rest or parked, so that the driver will not be injured seriously even when the vehicle collides against the object. Since the second embodiment will not provide the collision signal when the relative velocity is less than 30 Km/h, the frequency band of the signal to be processed in the relative velocity detecting unit V may be narrow. As a result, the electronic circuitry may be simpler in construction, more reliable in operation and less expensive to manufacture.

Third Embodiment, FIG. 1C

The third embodiment of the present invention is substantially similar to the first embodiment except that a direction detecting unit VI is additionally inserted between the analog signal processing unit II and the decision unit VII.

The direction detecting unit VI is based on the principle that the Doppler signals contained in the first and second terms of Eq. (1) are different in phase by 90° in the positive and negative directions and the Doppler signal of the first term advances before or lags behind the Doppler signal of the second term by 90° depending upon whether an object is approaching or moving away from the vehicle. In the present embodiment, the direction detecting unit VI provides an output signal only when an object is moving toward a vehicle.

In addition to the features of the first embodiment, the third embodiment has an important feature that the inadvertent operation of the sefeguarding device is prevented when an object is receding. When an object crosses the path of the vehicle at a relative velocity $v$, for example, in the direction as shown in FIG. 5, the right device detects the closing object with a relative velocity $v_R$, whereas the left device detects the receding object with a relative velocity $v_L$, and vice versa in the opposite direction. Thus, the comparator either in the right or left device will not generate a signal, so that the inadvertent operation of the safeguarding device may be prevented. Moreover, when the vehicle is passing an object neither of the right and left devices will provide an output signal, so that the inadvertent operation may be prevented. Thus the third embodiment can more positively prevent the inadvertent operation than the first embodiment.

Fourth Embodiment, FIGS. 1D and 2 – 8

The fourth embodiment generally comprises the wave processing unit I, the analog signal processing unit II, the collision distance detecting units III, the minimum level detecting unit IV, the relative velocity detecting unit V, the direction detecting unit VI and the decision unit VII. Since the fourth embodiment includes all of the units I – VII of the present invention, each unit will be described in more detail hereinafter.

Wave Processing Unit I, FIG. 6

The wave processing units I generally comprises the transmitting and receiving antennas 9 and 10, a coupler 11, a microwave modulator 12, a microwave oscillator 13, a first mixer 14 and a sine wave generator 15.

The arrangement and operations of the transmitting and receiving antennas 9 and 10 are described in detail hereinbefore so that no description will be made. The sine wave generator 15, which determines the FM frequency of the microwave signal, has output terminals connected to the input terminals of the microwave modulator 12 and a second mixer 18 in the analog signal processing unit II to be described hereinafter. The microwave modulator 12 which frequency modulates the microwave signals with a frequency deviation $\Delta f$ has an output terminal connected to the input terminal of the oscillator 13 for radiating the microwave signals with a sufficient output level. The output terminal of the microwave oscillator 13 is connected to one of the input terminals of the coupler 11. The other input terminal of the coupler 11 is connected to the receiving antenna 10, whereas the output terminals thereof are connected to the transmitting antenna 9 and the first mixer 14, respectively. The coupler 11 functions to apply the microwave to the transmitting antenna 9 and a portion of the transmitted wave to the first mixer 14, and to isolate the coupling between the transmitting and receiving antennas 9 and 10, so that the received wave is transmitted from the receiving antenna 10 to the first mixer 14. The first mixer 14 mixes the received wave with a portion of the transmitted wave to provide the low frequency wave or difference frequency signal.

Analog Signal Processing Unit II, FIGS. 6A to 6E

The analog signal processing unit II generally comprises a wideband amplifier 16, a bandpass filter 17, a second mixer 18, a bandpass filter 19, AC - DC converters 20 and 21 and wave shaping circuits 22 and 23.

The wideband amplifier 16 has an input terminal connected to the output terminal of the first mixer 14 in the wave processing unit I and an output terminal connected to the input terminals of the bandpass filter 17 and the second mixer 18. The function of the wideband amplifier 16 is to amplify the output signal of the first mixer 14 without distortion. The bandpass filter 17 has an output terminal connected to the input terminals of the AC - DC converter 20 and the wave shaping circuit 22. The function of the bandpass filter 17 is to pass only the Doppler component. The function of the AC - DC converter 20 is to convert the Doppler signal derived from a bandpass filter 17 into the DC signal. The function of the wave shaping circuit 22 is to shape the rectangular waveform having a period equal to that of the Doppler signal component derived from the bandpass filter 17.

The second mixer 18 has input terminals connected to the output terminals of the sine wave generator 15 and the wideband amplifier 16, and an output terminal connected to the input terminal of the bandpass filter 19, and mixes the output signal of the wideband amplifier 16 with the frequency modulating signal from the sine wave generator 15 to provide a signal in which the Doppler signal component is superposed upon a wave having a frequency higher than the modulation frequency. The bandpass filter 19, the AC - DC converter 21 and the wave shaping circuit 23 are similar in construction and function to the above bandpass filter 17, the AC - DC converter 20 and the wave shaping circuit 22, respectively. The bandpass filter 19 passes only the Doppler signal component, and the AC - DC converter 21 converts the Doppler signal derived from a bandpass filter 19 into the DC signal. The wave shaping circuit 23 converts the output signal derived from a bandpass filter 19 into the rectangular waveform whose period equals to that of the Doppler signal component derived from the bandpass filter 19.

Collision Distance Detecting Unit III

The distance detecting unit III generally comprises a comparator 35, whose input terminals are connected to the output terminals of the AC - DC converters 20 and 21 in the analog signal processing unit II. The comparator 35 compares the output signal of the AC - DC converter 20 with that of the AC - DC converter 21 so that when the former is higher than the latter, the comparator provides an output signal. In other words, when the distance to an object is less than one meter, the comparator 35 provides an output signal.

Minimum Level Detecting Unit IV

The minimum level detecting unit IV generally comprises a comparator 37 and a reference voltage source 38. The reference voltage source 38 supplies a reference voltage to one of the input terminals of the comparator 37, whereas the output signal of the AC - DC converter 21 in the analog signal processing unit II is fed to the other input terminal thereof. The comparator 37 compares the output signal voltage of the AC - DC converter 21 with the reference voltage so that only when the former is higher than the latter, the comparator provides an output signal.

Relative Velocity Detecting Unit V

The relative velocity detecting unit V generally comprises a counter 24, an RS flip-flop 25, a clock pulse generator 26, an AND circuit 27, a counter 28, a register 29, an OR circuit 30, delay circuits 31 and 32, a D - A converter 33, a reference voltage source 47 and a comparator 34.

The counter 24 has one input terminal connected to an output terminal of the wave shaping circuit 23 in the analog signal processing unit II, and has one output terminal connected to an input terminal of the OR circuit 30 and the other output terminal connected to an input terminal of the RS flip-flop 25. The counter 24 counts the pulses from the wave shaping circuit 23. The OR circuit 30 has another input terminal connected to an output terminal of the counter 28, and has an output terminal connected to the input terminal of the delay circuit 31 and to the other input terminal of the RS flip-flop 25. The OR circuit 30 gives the logical sum of the output signal generated by the counter 24 when it counts 15 pulses and the output signal generated from the counter 28 when it counts 14 pulses. The delay circuit 31 has an output terminal connected to the input terminal of the delay circuit 32 whose output terminal is connected to the other input terminal of the counter 24 and to one of the input terminals of the counter 28. The output terminal of the delay circuit 31 is also connected to an input terminal of the register 29 and to an input terminals of an integrator 41 to be described hereinafter. The delay circuit 31 functions to delay the output signal of the OR circuit 30. The delay circuit 32 further delays the output signal of the delay circuit 31.

The RS flip-flop 25 has an output terminal connected to one of two input terminals of the AND circuit 27, and is set when the counter 24 counts one pulse and continues to provide an output signal unitl a reset signal is applied. The clock pulse generator 26 is connected to the other input terminal of the AND circuit 27, and generates a rectangular waveform signal or pulse of 500 Hz. The AND circuit 27 has an output terminal connected to the other input terminal of the counter 28, and provides the logic product of the output signals of the RS flip-flop 25 and the clock pulse generator 26. The counter 28 has the other output terminal connected to the other input terminal of the register 29, and counts the pulses fed from the AND circuit 27.

The register 29 has an output terminal connected to the input terminal of the D - A converter 33, and functions to hold the output signal from the counter 28 until the shift signal is applied. The D - A converter 33 has an output terminal connected to one of the input terminals of the comparator 34, and functions to convert the digital signal fed from the register 29 into an analog signal. The reference voltage source 47 is connected to the other input terminal of the comparator 34, and provides a reference voltage therefor. The comparator 34 compares the output voltage of the D - A converter 33 with the reference voltage supplied from the reference voltage source 47 so that only when the voltage of the former is higher than that of the latter, the comparator 34 provides an output signal to the decision unit VII.

Direction Detecting Unit VI

The direction detecting unit VI generally comprises a D-type flip-flop 39, a monostable multivibrator 40, an integrator 41, a reference voltage source 43 and a comparator 42. The D-type flip-flop 39 has clock and D input terminals connected to the output terminals of the wave shaping circuits 22 and 23, respectively, and has an output terminal connected to the input terminal of the monostable multivibrator 40. The monostable multivibrator 40 whose output terminal is connected to the other input terminal of the integrator 41 is triggered in response to the output pulse from the D-type flip-flop 39 for generating pulses with a predetermined pulse width. The intergrator 41 whose output terminal is connected to one of the input terminals of the comparator 42 integrates the output signal from a monostable multivibrator 40 and holds the integrated signal until the reset signal is applied. The reference voltage source 43 is connected to the other input terminal of the comparator 42. The comparator 42 compares the output signal voltage of the integrator 41 with the reference voltage supplied from the reference voltage source 43 so that only when the voltage of the former is higher than that of the latter, the comparator 42 provides an output signal to the decision unit VII.

Decision Unit VII

The decision unit VII generally comprises the right and left AND circuits 44 and an AND circuit 45, four input terminals of the former being connected to the output terminals of the comparators 35, 37, 34 and 42 in the range detecting unit III, the minimum level detecting unit IV, the relative velocity detecting unit V and the direction detecting unit VI, respectively, so that only when the output signals of these comparators are simultaneously applied to the AND circuits 44, the AND circuit 45 generates the collision signal to actuate the device 46.

Operation, FIGS. 6A to 6E and 7

Next the mode of operation of the fourth embodiment will be described with reference to FIGS 6A to 6E and 7, the latter illustrating the waveforms of the signals obtained at various points in the block diagram shown in FIGS. 6A to 6E.

Wave Processing Unit I

The wave which is frequency-modulated by the modulator 12 is radiated toward an object by the transmitting antenna 9, and the wave reflected by an object is received by the receiving antenna 10 and fed into the first mixer 14. The first mixer mixes the received wave with a portion of the transmitted wave and provides an output signal to the wideband amplifier 16 in the analog signal precessing unit II.

Analog Signal Processing Unit II

Figure 7:
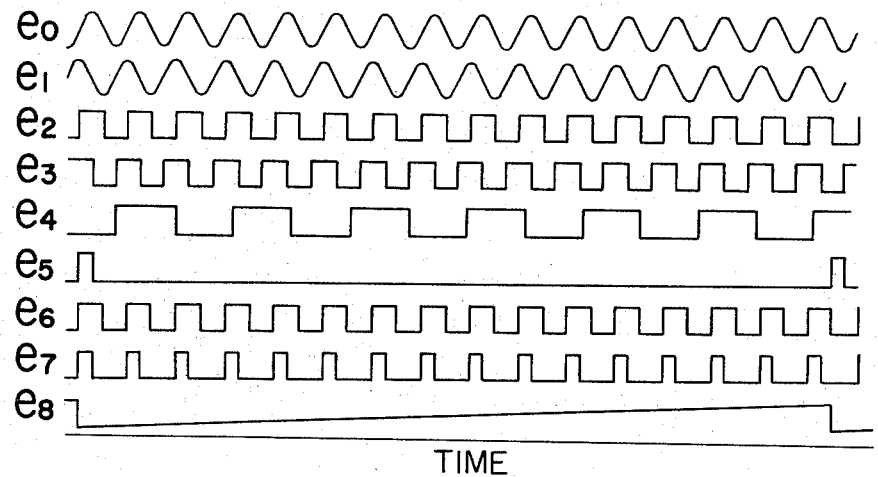
FIG. 7 illustrates the waveforms of the signals obtained at various points of the block diagram shown in FIG. 6.

The signal from the first mixer 14 is amplified by the wideband amplifier 16. The output signal of the wideband amplifier 16 is the signal given by Eq. (1) in which the Doppler signal component, the fundamental wave component and the harmonic components are superposed. The bandpass filter 17 passes only the Doppler signal component as shown in FIG. 7 at $e_o$. The second mixer 18 mixes the output signal of the wideband amplifier 16 with the output signal of the sine wave generator 15 in the wave processing unit I to provide an output signal in which the Doppler signal component contained in the second term of Eq. (1) the fundamental wave component and the harmonic components are superposed. The bandpass filter 19 only passes the Doppler signal component as shown in FIG. 7 at $e_1$. Thus, the maximums of the output signals of the bandpass filters 17 and 19 are proportional to $rJ_0(m_r)$ and $2rJ_1(m_r)$ as is clear from Eq. (1).

The AC - DC converters 20 and 21 convert the output signals from the bandpass filters 17 and 19 into the corresponding DC voltage signals. The wave shaping circuits 22 and 23 shape the rectangular waveform signals or pulses whose periods are equal to those of the output signals from the bandpass filters 17 and 19 and whose pulse widths and amplitudes are constant as shown in FIG. 7 at $e_2$ and $e_3$.

Relative Velocity Detecting Unit V

When the counter 24 is reset, it sets the RS flip-flop 25 when it counts one pulse from the wave shaping circuit 23, and provides an output signal when it counts 15 pulses. The output signal is fed into the OR circuit 30, delayed in time by the delay circuits 31 and 32 and applied to the reset terminal of the counter 24 so that the counter 24 is reset. The reset signal is also applied thereto when the counter 28 counts 14 pulses so that the counter 24 is reset. The above operation is cycled. The above circuit components constitute the so-called "decision time detecting circuit" which is reset every 15 waves of the Doppler signal.

The clock pulses from the clock pulse generator 26 are fed into the counter 28 through the AND circuit 27 only when the RS flip-flop 25 is set. When the counter 28 counts 14 pulses, it provides an output signal to the OR circuit 30. This output signal is fed to the reset terminal of the counter 28 after it is delayed in time by the delay circuits 31 and 32 so that the counter 28 is reset. The counter 28 is also reset when the counter 24 counts 15 pulses. When the output or shift signal is applied to the register 29 from the delay circuit 31, the register 29 reads and holds the output signal of the counter 28 and then transfers it to the D - A converter 33.

The output signal or pulse of the clock pulse generator 26 is shown at $e_4$ in FIG. 7, whereas the reset signal to be applied to the counter 28 is shown at $e_5$ in FIG. 7. The interval between the reset pulses $e_5$ becomes smaller as the relative velocity is higher, and vice versa. When the relative velocity is low, the interval between the reset pulses equals to 14 clock pulses. The number of output pulses from the register 29 equals to the number of clock pulses counted during the interval between the reset pulses so that it may become greater when the relative velocity is low, and vice versa.

The D-A converter 33 provides a DC output signal in inverse proportion to the number of output pulses from the register 29. The reference voltage supplied from the reference voltage source 47 is the DC output voltage corresponding to the relative velocity of 30 Km/h, so that the comparator 34 provides an output signal to the AND circuit 44 in the decision unit VII only when the relative velocity is in excess of 30 Km/h.

Collision Distance Detecting Unit III, FIGS. 6A to 6E, 7 and 8

Figure 8:
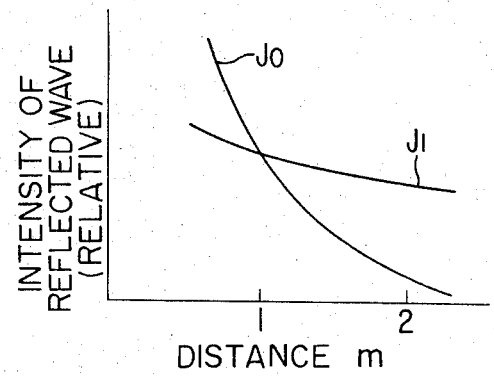
FIG. 8 is a graph illustrating the relation between the distance to an object and the intensity of the reflected wave.
Figure 6A:
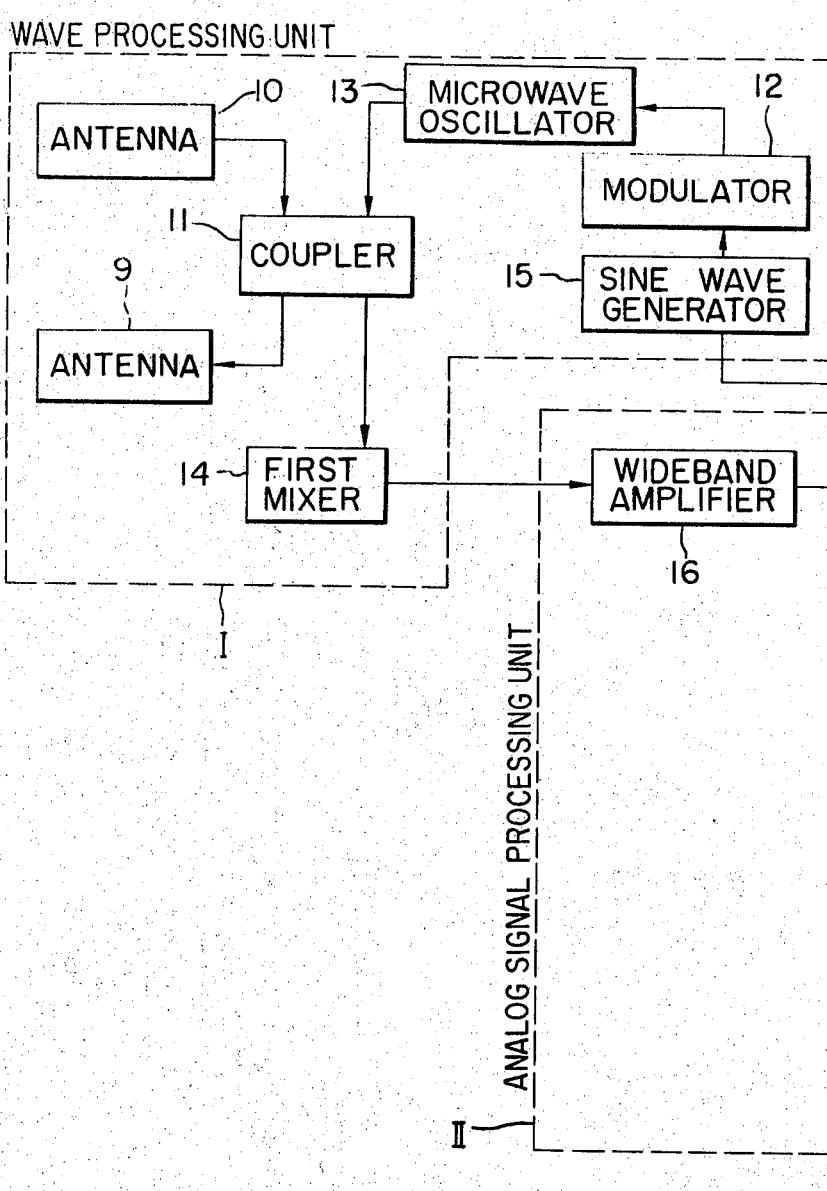
Figure 6B:
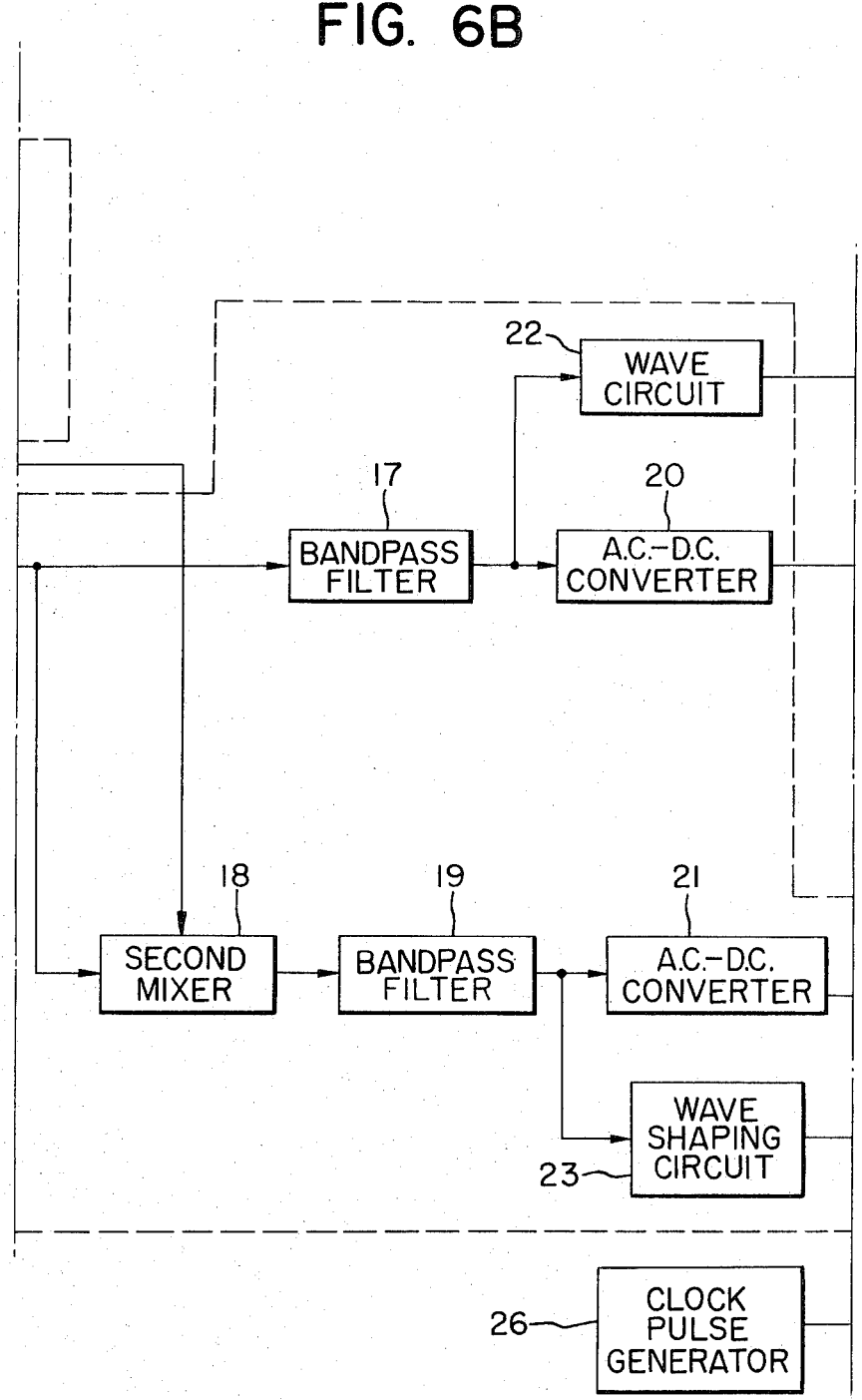
Figure 6C:
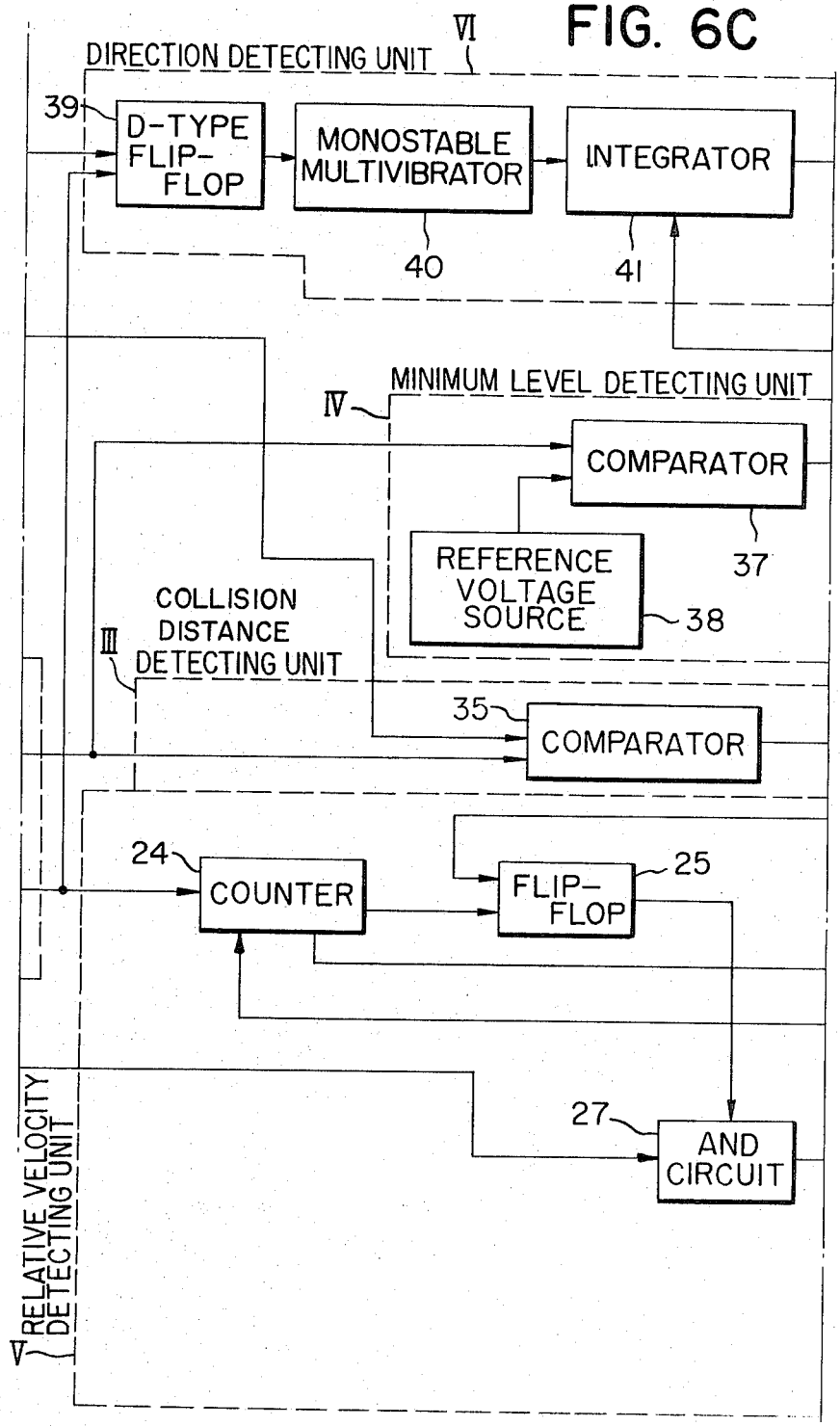
Figure 6D:
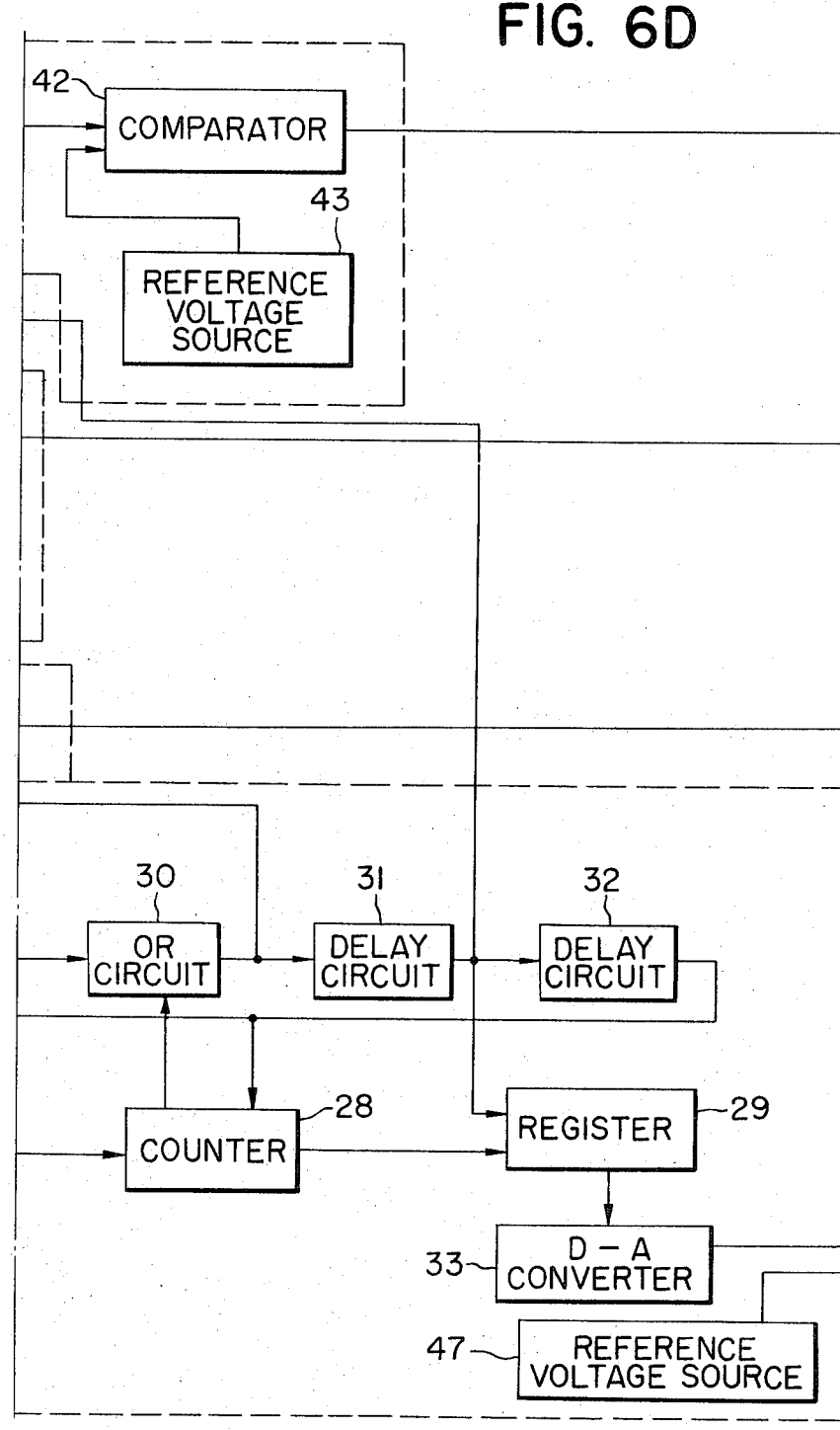

The output signal voltages which are fed from the AC - DC converters 20 and 21 in the analog signal processing unit II to the comparator 35 are varied in intensity as indicated by $J_0$ and $J_1$, respectively in FIG. 8. The comparator 35 provides an output signal when the distance between an object and a vehicle is less than one meter. More particularly the ratio in intensity between the output signals of the AC - DC converters 20 and 21 in the analog signal processing unit II is varied depending upon the distance between an object and a vehicle as shown in FIG. 4, and the AC - DC converters 20 and 21 in the instant embodiment have such intensity-distance characteristics as shown in FIG. 8. In FIG. 8, the distance is plotted along the abscissa, whereas the relative intensity appears along the ordinate. The output of the AC - DC converter 20 is denoted by $J_0$ whereas that of the AC - DC converter 21 by $J_1$. It is seen that the relative intensities $J_0$ and $J_1$ are equal at a distance of one meter. Thus the comparator 35 provides an output signal when the distance between an object and a vehicle is less than one meter.

Minimum Level Detecting Unit IV

The comparator 37 compares the signal voltage of the AC - DC converter 21 in the analog signal processing unit II with the reference voltage supplied from the reference voltage source 38 so that the comparator 37 provides an output signal to the AND circuit 44 only when the voltage of the former is higher than that of the latter. The reference voltage is set to the voltage that would normally be provided by AC-DC converter 21 when the distance between an object and a vehicle is two meters, so that the comparator 37 provides an output signal when the distance is less than about two meters.

Direction Detecting Unit VI

The output signal waveforms $e_2$ and $e_3$ of the wave shaping circuits 22 and 23 shown in FIG. 7 are those that normally result when an object is moving toward the vehicle, that is, when the distance between the vehicle and an object is decreasing. When an object is moving away from the vehicle, the waveform $e_3$ of the wave shaping circuit 23 is reversed. The output signals of the wave shaping circuits 22 and 23 are applied to the clock and D input terminals of the D-type flip-flop 39, respectively, so that the D-type flip-flop 39 provides an output signal with the waveform $e_6$ in FIG. 7. This output signal is applied to the monostable multivibrator 40 so that the rise time of the output pulses of the monostable multivibrator 40 coincides with that of the output pulses $e_6$ of the D-type flip-flop 39 as shown in FIG. 7 at $e_7$. The output pulses $e_7$ having the constant pulse width are applied to the integrator 41. The output signal voltage of the integrator 41 to be applied to the comparator 42 is in proportion to the number of output pulses of the monostable multivibrator 40 as shown in FIG. 7 at $e_8$. (In practice the output signal waveform $e_8$ is of a stepped form, but for the sake of simplicity the waveform $e_8$ is indicated by the straight line in FIG. 7). In response to the reset signal, the integrator 41 is cleared or reset and the above operation is cycled in the same manner. The reference voltage supplied from the reference voltage source 43 is set to the output voltage obtained when 12 input pulses are integrated by the integrator 41, so that the comparator 42 provides an output signal to the AND circuit 44 when more than 12 pulses are fed into the integrator 41.

When an object is moving away from the vehicle, the output signal voltage of the D-type flip-flop 39 is zero so that the comparator 42 will not provide an output signal to the AND circuit 44.

In summary, the direction detecting unit VI in accordance with the present invention provides an output signal only when an object is moving toward the vehicle, but will not provide an output signal when an object is moving away from the vehicle. Thus the direction detecting unit VI detects a direction of a relative movement of the object with respect to the vehicle.

Decision Unit VII

The AND circuit 44 provides an output signal only when the output signals of the comparators 34, 35, 37 and 42 in the relative velocity detecting unit V, the collision distance detecting unit III, the minimum level detecting unit IV and the direction detecting unit VI are simultaneously applied to the AND circuit 44. The AND circuit 45 provides an output signal only when both of the right and left AND circuits 44 provide output signals so that the safeguarding device operatively coupled to the collision anticipating device of the present may be actuated at the optimum time under the predetermined conditions.

In the fourth embodiment, only when the right and left collision distance detecting units III, minimum level detecting units IV, relative velocity detecting units V and direction detecting units VI simultaneously provide output signals to the decision unit VII, the latter provides a collision signal to actuate the safeguarding device. Therefore the inadvertent operation of the safeguarding device due to variations of reflection factors and shapes of objects, due to an object merely crossing the path of a vehicle or due to the vehicle passing an object, so that no collision occurs, or when a vehicle is traveling at a low speed or at rest so that a driver will not be seriously injured even in collision, will be prevented. Further, the method for measuring the distance to an object employed in the present invention can detect an object even at a very close distance, for example 1 to 2 meters from a vehicle with an extreme accuracy, so that even when a vehicle collides against another vehicle at a very high speed, the safeguarding device may be actuated at the optimum time. In the radar system employed in the present invention, the same intensity ratio is indicated in response to two different distances to an object, but this problem has been overcome by the arrangements of the transmitting and receiving antennas 9 and 10 and by the provision of the minimum level detecting unit VI in accordance with the present invention.

In the fourth embodiment, the distance to an object from a vehicle is not always measured, but the system for detecting whether an object is within a predetermined distance or not is employed. However the effects of the collision anticipating device of the present invention are substantially similar to those of the prior art devices of the type which always measures the distance to an object. Moreover the electronic circuitry is simpler in construction, more reliable in operation and more inexpensive to manufacture. Furthermore the relative velocity V is so designed as not to provide an output signal when the detected relative velocity is less than 30 Km/h. In other words, the relative velocity detecting unit V provides an output signal only when it becomes necessary to actuate the safeguarding device, i.e., when the relative velocity is in a range between 30 Km/h and 100 Km/h, so that the frequency band of the signals to be processed by the unit V may be narrow. Therefore the electronic circuitry becomes simpler in construction, and accordingly more reliable in operation and less expensive to manufacture. The decision time detection circuit comprising the counter 24 and the RS flip-flop 25 deals with 15 waves of the Doppler signal as one time unit (20 cm in terms of distance) so that even when a few of the 15 waves are distorted by the noise, the inadvertent operation of the safeguarding device may be prevented because of the effect of integration. In the event that a microwave signal of 10 GHz is used as in the instant embodiment, the intensity of the wave reflected by an object having complicated shapes such as a vehicle may be considerably suppressed at the minimum of every 50 cm, but the suppression corresponds to only a few of the 15 waves of the Doppler signal so that the inadvertent operation of the safeguarding device may be also prevented.

In addition to the novel features and advantages of the present invention described hereinbefore, the present invention has the following features over the prior art system of the type which always measures the time left before the collision takes place:

1. The safeguarding device is actuated when the distance to an object is less than a predetermined distance independently of the relative velocity so that relative velocity detecting and calculating circuits may be eliminated. Thus the electronic circuitry of the present invention is simple and economical. Moreover the collision anticipating device in accordance with the present invention is especially suitable for use with a vehicle which will not travel at a high speed.

2. In the prior art collision anticipating device of the type measuring the time left before a vehicle collides against an object, a compensating circuit is required in order to ensure the correct operation against an object in the whole detection range regardless of the position and angle of the object entering into the detection range. However, the collision anticipating device of the present invention does not require such a compensating circuit.

The above embodiments employ a special radar system which can detect the distance to an object even at a short distance with high accuracy and which gives two different distances to an object from the same intensity ratio, but it should be understood that the present invention is not limited thereto. Any suitable radar system which detects the distance from a phase difference such as the AM radar system or two-frequency radar system may be employed in the present invention to detect whether the distance to an object from a vehicle is less than a predetermined distance or not, thereby actuating a safeguarding device at the optimum time for protecting a driver in case of collision. Moreover the predetermined distance to an object at which the safeguarding device is actuated may be suitably adjusted. In the above embodiments, the bistatic radar systems having two transmitting antennas and two receiving antennas have been described, but the present invention may employ any bistatic radar system using one or more transmitting antennas and receiving antennas.

It will be understood that various modifications and variations may be effected without departing from the scope of the present invention.

What is claimed is:

1. A vehicle collision anticipating device comprising wave processing means for transmitting a wave by a transmitting antenna installed at a predetermined position and angle of a vehicle, for receiving a reflected wave from an object by a receiving antenna installed at a predetermined position and angle of the vehicle and for generating a low frequency wave by mixing said transmitted and reflected waves, said receiving antenna being so installed that the beam axis of said receiving antenna may intersect that of said transmitting antenna in a predetermined range, analog signal processing means connected to said wave processing means for signal processing said low frequency wave and at least one Doppler signal obtained from said low frequency wave, and for generating signals, collision distance detecting means connected to said analog signal processing means for detecting a distance between the vehicle and object in response to the signals from said analog signal processing means, and for generating a signal when the object enters a predetermined distance range, minimum level detecting means connected to said analog signal processing means for detecting an intensity of a Doppler signal obtained from said low frequency wave, and for generating a signal when said intensity of a Doppler signal reaches a predetermined minimum level so as to detect the object to enter a predetermined detection range determined by the positions and angles of the transmitting and receiving antennas, and decisions means connected to said collision distance detecting means and minimum level detecting means for generating a signal in response to the simultaneous generation of signals by said collision distance detecting means and minimum level detecting means, there by anticipating a collision of the object against the vehicle.

2. A vehicle collision anticipating device as set forth in claim 1, further comprising relative velocity detecting means connected to said analog signal processing means for detecting a relative velocity of the object with respect to the vehicle in response to the signals from said analog signal processing means and for generating a signal when said relative velocity reaches a predetermined velocity, and wherein said decision means is further connected to said relative velocity detecting means for generating a signal in response to the simultaneous generation of signals by said collision distance detecting means, minimum level detecting means and relative velocity means.

3. A vehicle collision anticipating device as set forth in claim 2, further comprising direction detecting means connected to said analog signal processing means for detecting a direction of a relative movement of the object with respect to the vehicle in response to the signals from said analog signal processing means, and for generating a signal when the object approaches the vehicle, and wherein said decision means is further connected to said direction detecting means for generating a signal in response to the simultaneous generation of signals by said collision distance detecting means, minimum level detecting means, relative velocity detecting means and direction detecting means.

4. A vehicle collision anticipating device as set forth in claim 3, wherein said collision distance detecting means comprises means for computing an intensity ratio between the maximum values of at least two Doppler signals and generates a signal when the intensity ratio reaches a predetermined value corresponding to the predetermined distance, said relative velocity detecting means comprises means for detecting an angular frequency of the Doppler signal so as to detect the relative velocity of the object with respect to the vehicle, and said direction detecting means comprises means for detecting a phase relation between at least two Doppler signals so as to detect the direction of the relative movement of the object with respect to the vehicle.

5. A vehicle collision anticipating device as set forth in claim 4, wherein said wave processing means comprises two wave processing units, each of said wave processing units comprising a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the transmitting and receiving antennas being so mounted on the right and left of the vehicle that the beams may intersect each other to form the predetermined detection ranges, said analog signal processing means comprises two analog signal processing units, said collision distance detecting means comprises two collision distance detecting units for generating a signal when the intensity ratio reaches a predetermined value corresponding to the distance of one meter from the vehicle, said minimum level detecting means comprises two minimum level detecting units, said relative velocity detecting means comprises two relative velocity detecting units in which said relative velocity is predetermined to be 30 Km/h, said direction detecting means comprises two direction detecting units for detecting a phase relation between at least two Doppler signals, and said decision means comprises a decision unit for generating a signal in response to the simultaneous generation of signals by said collision distance detecting units, minimum level detecting units, relative velocity detecting units and direction detecting units.

6. A vehicle collision anticipating device as set forth in claim 5, wherein said analog signal processing unit comprises a wideband amplifier connected to said first mixer of said wave processing unit, a first bandpass filter connected to said wide band amplifier, a first AC-DC converter connected to said first bandpass filter, a first wave shaping circuit connected to said first bandpass filter, a second mixer connected to said wideband amplifier and to said sine wave generator, a second bandpass filter connected to said second mixer, a second AC-DC converter connected to said second bandpass filter, and a second wave shaping circuit connected to said second bandpass filter, said collision distance detecting unit comprises a comparator connected to said first and second AC-DC converters of said analog signal processing unit, said minimum level detecting unit comprises a comparator connected to said second wave shaping circuit of said analog signal processing unit and a refernece voltage source which is connected to said comparator and supplies a reference voltage, said relative velocity detecting unit comprises a first counter connected to said second wave shaping circuit of said analog signal processing unit, an RS flip-flop connected to said first counter, an AND circuit connected to said RS flip-flop, a clock pulse generator connected to said AND circuit, an OR circuit connected to said first counter, a first delay circuit connected to said OR circuit, a second delay circuit connected to said first delay circuit, a second counter connected to said AND circuit, OR circuit and second delay circuit, a register connected to said first delay circuit and second counter, a D-A converter connected to said register, and a comparator connected to said D-A converter and a reference voltage source, said direction detecting unit comprises a D-type flip-flop connected to said first and second wave shaping circuits of said analog signal processing unit, a monostable multivibrator connected to said D-type flip-flop, an integrator connected to said monostable multivibrator, and a comparator connected to said integrator and a reference voltage source, and said decision unit comprises three AND circuits which are connected to said collision distance detecting unit, minimum level detecting unit, relative velocity detecting unit, and a direction detecting unit.

7. A vehicle collision anticipating device as set forth in claim 2, wherein said collision distance detecting means comprises means for computing an intensity ratio between the maximum values of at least two Doppler signals and generates a signal when the intensity ratio reaches a predetermined value corresponding to the predetermined distance, and said relative velocity detecting means comprises means for detecting an angular frequency of the Doppler signal so as to detect the relative velocity of the object with respect to the vehicle.

8. A vehicle collision device anticipating device as set forth in claim 7, wherein said wave processing means comprises two wave processing units, each of said wave processing units comprising a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the transmitting and receiving antennas being so mounted on the right and left of the vehicle that the beams may intersect each oJher to form the predetermined detection ranges, said analog signal processing means comprises two analog signal processing units, said collision distance detecting means comprises two collision distance detecting units for generating a signal when the intensity ratio reaches a predetermined value corresponding to the distance of one meter from the vehicle, said minimum level detecting means comprises two minimum level detecting units, said relative velocity detecting means comprises two relative velocity detecting units in which said relative velocity is predetermined to be 30 Km/h, and said decision means comprises a decision unit for generating a signal in response to the simultaneous generation of signals by said collision distance detecting units, minimum level detecting units and relative velocity detecting units.

9. A vehicle collision anticipating device as set forth in claim 1, further comprising direction detecting means connected to said analog signal processing means for detecting a direction of a relative movement of the object with respect to the vehicle in response to the signals from said analog signal processing means, and for generating a signal when the object approaches the vehicle, and wherein said decision means is further connected to said direction detecting means for generating a signal in response to the simultaneous generation of signals by said collision distance detecting means, minimum level detecting means and direction detecting means.

10. A vehicle collision anticipating device as set forth in claim 9, wherein said collision distance detecting means comprises means for computing an intensity ratio between the maximum values of at least two Doppler signals and generates a signal when the intensity ratio reaches a predetermined value corresponding to the predetermined distance, and said direction detecting means comprises means for detecting a phase relation between at least two Doppler signals so as to detect the direction of the relative movement of the object with respect to the vehicle.

11. A vehicle collision anticipating device as set forth in claim 10, wherein said wave processing means comprises two wave processing units, each of said wave processing units comprising a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the transmitting and receiving antennas being so mounted on the right and left of the vehicle that the beams may intersect each other to form the predetermined detection ranges, said analog signal processing means comprises two analog signal processing units, said collision distance detecting means comprises two collision distance detecting units for generating a signal when the intensity ratio reaches a predetermined value corresponding to the distance of one meter from the vehicle, said minimum level detecting means comprises two minimum level detecting units, said direction detecting means comprises two direction detecting units for detecting a phase relation between at least two Doppler signals, and said decision means comprises a decision unit for generating a signal in response to the simultaneous generation of signals by said collision distance detecting units, minimum level detecting units and direction detecting units.

12. A vehicle collision anticipating device as set forth in claim 1, wherein said collision distance detecting means comprises means for computing an intensity ratio between the maximum values of at least two Doppler signals and generates a signal when the intensity ratio reaches a predetermined value corresponding to the predetermined distance.

13. A vehicle collision anticipating device as set forth in claim 12, wherein said wave processing means comprises two wave processing units, each of said wave processing units comprising a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the transmitting and receiving antennas being so mounted on the right and left sides of the vehicle that the beams may intersect each other to form the predetermined detection ranges, said analog signal processing means comprises two analog signal processing units, said collision distance detecting means comprises two collision distance detecting units for generating a signal when the intensity ratio reaches a predetermined value corresponding to the distance of one meter from the vehicle, said minimum level detecting means comprises two minimum level detecting units, and said decision means comprises a decision unit for generating a signal in response to the simultaneous generation of signals by said collision distance detecting units and minimum level detecting units.

* * * * *

UNITED STATES PATENT OFFICE
CERTIFICATE OF CORRECTION

Patent No. 3,860,923          Dated January 14, 1975

Inventor(s) Teruo Yamanaka, et al

It is certified that error appears in the above-identified patent and that said Letters Patent are hereby corrected as shown below:

On the Title page, left column, line 7 (Assignees):

change "Toyoto" to --Toyota--.

Column 1, line 54:  change "the" to --a--.

Column 2, line 7:  change "the" to --a--.

Column 7, line 29:  change "now" to --not--.

line 53:  change "th" to --the--.

Column 8, line 47:  change "refernece" to --reference--.

Column 9, line 24:  change "safeguarding" to

--safeguarding--.

Column 11, line 48:  change "unitl" to --until--.

Column 19, line 11:  change "refernece" to --reference--.

line 66:  change "oJher" to --other--.

Signed and sealed this 17th day of June 1975.

(SEAL)
Attest:

RUTH C. MASON
Attesting Officer

C. MARSHALL DANN
Commissioner of Patents
and Trademarks